US012683280B2

(12) United States Patent
Chen et al.

(10) Patent No.: US 12,683,280 B2
(45) Date of Patent: Jul. 14, 2026

(54) ANTENNA, ANTENNA ARRAY, AND ELECTRONIC DEVICE

(71) Applicants: Beijing BOE Sensor Technology Co., Ltd., Beijing (CN); BOE Technology Group Co., Ltd., Beijing (CN)

(72) Inventors: Lu Chen, Beijing (CN); Yiming Wang, Beijing (CN); Xiaoqiang Yang, Beijing (CN); Wei Zhao, Beijing (CN); Mengjiao Li, Beijing (CN); Zhifeng Zhang, Beijing (CN)

(73) Assignees: Beijing BOE Sensor Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 92 days.

(21) Appl. No.: 18/635,116

(22) Filed: Apr. 15, 2024

(65) Prior Publication Data

US 2024/0356230 A1 Oct. 24, 2024

Related U.S. Application Data

(63) Continuation of application No. PCT/CN2023/089417, filed on Apr. 20, 2023.

(51) Int. Cl.
*H01Q 9/04* (2006.01)
*H01Q 9/28* (2006.01)

(52) U.S. Cl.
CPC ........... *H01Q 9/0442* (2013.01); *H01Q 9/045* (2013.01); *H01Q 9/285* (2013.01)

(58) Field of Classification Search
CPC ....... H01Q 9/0442; H01Q 9/045; H01Q 9/285
See application file for complete search history.

(56) References Cited

U.S. PATENT DOCUMENTS 11,528,076 B1 * 12/2022 Bily .................... H04B 7/18515
2020/0106181 A1 * 4/2020 Avser ..................... H01Q 1/243
(Continued)

FOREIGN PATENT DOCUMENTS

CN 110350310 A 10/2019
CN 210123797 U 3/2020
(Continued)

OTHER PUBLICATIONS

PCT/CN2023/089417 international search report dated Jan. 4, 2024.
CN202380008719.7 First office action dated Jan. 26, 2026.

*Primary Examiner* — Thien M Le
(74) *Attorney, Agent, or Firm* — IPro, PLLC

(57) ABSTRACT

Provided is an antenna. The antenna includes: a first antenna unit and a second antenna unit, wherein the first antenna unit includes a first phase-tuning structure and a first radiation structure, and the second antenna unit includes a second phase-tuning structure and a second radiation structure; wherein a first feed terminal of the first phase-tuning structure is electrically connected to the first radiation structure, and a first feed terminal of the second phase-tuning structure is electrically connected to the second radiation structure; and a feed direction of the first feed terminal of the first phase-tuning structure to the first radiation structure is a first direction, and a feed direction of the first feed terminal of the second phase-tuning structure to the second radiation structure is a second direction, the first direction being different from the second direction.

18 Claims, 11 Drawing Sheets

(56) References Cited

U.S. PATENT DOCUMENTS

| | | | | |
|---|---|---|---|---|
| 2020/0280133 | A1 | 9/2020 | Avser et al. | |
| 2021/0098882 | A1* | 4/2021 | Paulotto | H01Q 1/243 |
| 2021/0305683 | A1* | 9/2021 | Hou | H01Q 5/48 |
| 2021/0328355 | A1* | 10/2021 | Xi | H01Q 5/357 |
| 2022/0077596 | A1* | 3/2022 | Xi | H01Q 21/0075 |
| 2022/0131274 | A1* | 4/2022 | Min | H01Q 3/30 |
| 2022/0247219 | A1* | 8/2022 | Shi | H02J 50/005 |
| 2023/0138258 | A1* | 5/2023 | Lei | H01Q 3/36 343/853 |
| 2023/0361466 | A1* | 11/2023 | Tang | H01Q 3/36 |
| 2024/0275008 | A1* | 8/2024 | Fang | H01P 1/18 |

FOREIGN PATENT DOCUMENTS

| | | | |
|---|---|---|---|
| CN | 111628275 | A | 9/2020 |
| CN | 114171896 | A | 3/2022 |
| WO | 2022110013 | A1 | 6/2022 |
| WO | 2022178805 | A1 | 9/2022 |

* cited by examiner

ANTENNA, ANTENNA ARRAY, AND ELECTRONIC DEVICE

CROSS-REFERENCE TO RELATED APPLICATION

This application is a continuation application of international application No. PCT/CN2023/089417, filed on Apr. 20, 2023, the disclosure of which is herein incorporated by reference in its entirety.

TECHNICAL FIELD

The present disclosure relates to the field of communication technologies, in particular to an antenna, an antenna array, and an electronic device.

BACKGROUND

Shifters, as important devices for antennas, are determined as delay lines. A phase-tunable shifter is acquired by replacing a traditional solid base substrate with a tunable dielectric material, and the liquid crystal is a tunable dielectric material.

SUMMARY

Some embodiments of the present disclosure provide an antenna. The antenna includes: a first antenna unit and a second antenna unit, wherein the first antenna unit includes a first phase-tuning structure and a first radiation structure, and the second antenna unit includes a second phase-tuning structure and a second radiation structure; wherein a first feed terminal of the first phase-tuning structure is electrically connected to the first radiation structure, and a first feed terminal of the second phase-tuning structure is electrically connected to the second radiation structure; and a feed direction of the first feed terminal of the first phase-tuning structure to the first radiation structure is a first direction, and a feed direction of the first feed terminal of the second phase-tuning structure to the second radiation structure is a second direction, the first direction being different from the second direction.

In some embodiments, in the case that the first antenna unit rotates by a predetermined angle and overturns by 180°, the first feed terminal of the first phase-tuning structure is coincident with the first feed terminal of the second phase-tuning structure, and the first radiation structure is coincident with the second radiation structure.

In some embodiments, the antenna further includes: a first dielectric substrate and a second dielectric substrate that are opposite to each other, wherein the first phase-tuning structure and the second phase-tuning structure are disposed between the first dielectric substrate and the second dielectric substrate, an orthographic projection of the first radiation structure on the first dielectric substrate is a first pattern, and an orthographic projection of the second radiation structure on the first dielectric substrate is a second pattern; and an orthographic projection of the first radiation structure on the first dielectric substrate is a first pattern, and an orthographic projection of the second radiation structure on the first dielectric substrate is a second pattern; wherein an orthographic projection of the first phase-tuning structure on the first dielectric substrate is at least partially disposed between the first pattern and the second pattern, or an orthographic projection of the second phase-tuning structure on the first dielectric substrate is at least partially disposed between the first pattern and the second pattern.

In some embodiments, the antenna further includes: a first dielectric substrate and a second dielectric substrate that are opposite to each other; wherein the first phase-tuning structure includes a first electrode on a side, close to the second dielectric substrate, of the first dielectric substrate, a second electrode on a side, close to the first dielectric substrate, of the second dielectric substrate, and a first tunable dielectric layer between the first electrode and the second electrode; and the second phase-tuning structure includes a third electrode on a side, close to the second dielectric substrate, of the first dielectric substrate, a fourth electrode on a side, close to the first dielectric substrate, of the second dielectric substrate, and a second tunable dielectric layer between the third electrode and the fourth electrode.

In some embodiments, the antenna further includes: a third dielectric substrate, a first reference electrode layer, and a second reference electrode layer; wherein the third dielectric substrate is disposed on a side, facing away from the first dielectric substrate, of the second dielectric substrate;

the first reference electrode layer is disposed between the second dielectric substrate and the third dielectric substrate, and a first via and a second via are defined in the first reference electrode layer, wherein the first feed terminal of the first phase-tuning structure is electrically connected to the first radiation structure through the first via, and the first feed terminal of the second phase-tuning structure is electrically connected to the second radiation structure through the second via; and the second reference electrode layer is disposed on a side, facing away from the second dielectric substrate, of the first dielectric substrate.

In some embodiments, each of the first radiation structure and the second radiation structure includes a first radiation portion and a second radiation portion, and the antenna further includes a third dielectric substrate, a first reference electrode layer, and a second reference electrode layer; wherein the third dielectric substrate is disposed on a side, facing away from the first dielectric substrate, of the second dielectric substrate;

the first reference electrode layer is disposed between the second dielectric substrate and the third dielectric substrate, and a first via and a second via are defined in the first reference electrode layer, wherein the first feed terminal of the first phase-tuning structure is electrically connected to the first radiation portion of the first radiation structure through the first via, and the first feed terminal of the second phase-tuning structure is electrically connected to the first radiation portion of the second radiation structure through the second via; and the second reference electrode layer is disposed on a side, facing away from the second dielectric substrate, of the first dielectric substrate, and a third via and a fourth via are defined in the second reference electrode layer, wherein a second feed terminal of the first phase-tuning structure is electrically connected to the second radiation portion of the first radiation structure through the third via, and a second feed terminal of the second phase-tuning structure is electrically connected to the second radiation portion of the second radiation structure through the fourth via.

In some embodiments, the antenna further includes: a third dielectric substrate, a fourth dielectric substrate, a first reference electrode layer, a second reference electrode layer, a first feed source, and a second feed source; wherein the third dielectric substrate is disposed on a side, facing away from the first dielectric substrate, of the second dielectric substrate;

the first reference electrode layer is disposed between the second dielectric substrate and the third dielectric substrate, and a first via and a second via are defined in the first reference electrode layer, wherein the first feed terminal of the first phase-tuning structure is electrically connected to the first radiation structure through the first via, and the first feed terminal of the second phase-tuning structure is electrically connected to the second radiation structure through the second via;

the second reference electrode layer is disposed on a side, facing away from the second dielectric substrate, of the first dielectric substrate, and a third via and a fourth via are defined in the second reference electrode layer;

the fourth dielectric substrate is disposed on a side, facing away from the first dielectric substrate, of the second reference electrode layer; and the first feed source and the second feed source are disposed on a side, facing away from the second reference electrode layer, of the fourth dielectric substrate, the first feed source is electrically connected to a second feed terminal of the first phase-tuning structure through the third via, and the second feed source is electrically connected to a second feed terminal of the second phase-tuning structure through the fourth via.

In some embodiments, the first direction is perpendicular to the second direction.

Some embodiments of the present disclosure provide an antenna array. The antenna array includes: the antenna in any of the above embodiments.

In some embodiments, a plurality of antennas are organized to a plurality of first antenna sets juxtaposed in a third direction and a plurality of second antenna sets juxtaposed in a fourth direction; wherein the antennas in the plurality of first antenna sets are juxtaposed in the fourth direction, and the antennas in the plurality of second antenna sets are juxtaposed in the third direction; and a distance between the first radiation structures in the antennas adjacent in the third direction is a first distance, and a distance between the second radiation structures in the antennas adjacent in the third direction is a second distance, the first distance being equal to the second distance; or a distance between the first radiation structures in the antennas adjacent in the fourth direction is a third distance, and a distance between the second radiation structures in the antennas adjacent in the fourth direction is a fourth distance, the third distance being equal to the fourth distance.

In some embodiments, a plurality of antenna units are organized to a plurality of first antenna sets juxtaposed in a third direction, wherein the antennas in the plurality of first antenna sets are juxtaposed in a fourth direction, and adjacent first antenna sets in the plurality of first antenna sets are offset, wherein for two antennas in the adjacent first antenna sets with a same order, a distance between two first radiation structures in the two antennas is a fifth distance, and a distance between two second radiation structures in the two antennas is a sixth distance, the fifth distance being equal to the sixth distance.

In some embodiments, the antenna further includes a first dielectric substrate and a second dielectric substrate that are opposite to each other, wherein the first phase-tuning structure includes a first electrode on a side, close to the second dielectric substrate, of the first dielectric substrate, a second electrode on a side, close to the first dielectric substrate, of the second dielectric substrate, and a first tunable dielectric layer between the first electrode and the second electrode; the second phase-tuning structure includes a third electrode on a side, close to the second dielectric substrate, of the first dielectric substrate, a fourth electrode on a side, close to the first dielectric substrate, of the second dielectric substrate, a fourth bias voltage line electrically connected to the fourth electrode, and a second tunable dielectric layer between the third electrode and the fourth electrode; and a plurality of antenna units are organized to a plurality of first antenna sets juxtaposed in a third direction, wherein the antennas in the plurality of first antenna sets are juxtaposed in a fourth direction;

first electrodes in the first antenna units in the plurality of first antenna sets are connected to a same first bias voltage line, and third electrodes in the second antenna units in the plurality of first antenna sets are respectively connected to different third bias voltage lines; and second electrodes in the first antenna units in the plurality of first antenna sets are respectively connected to different second bias voltage lines, and fourth electrodes in the second antenna units in the plurality of first antenna sets are respectively connected to a same fourth bias voltage line.

In some embodiments, the antenna further includes a first dielectric substrate and a second dielectric substrate that are opposite to each other, wherein the first phase-tuning structure includes a first electrode on a side, close to the second dielectric substrate, of the first dielectric substrate, a second electrode on a side, close to the first dielectric substrate, of the second dielectric substrate, and a first tunable dielectric layer between the first electrode and the second electrode; the second phase-tuning structure includes a third electrode on a side, close to the second dielectric substrate, of the first dielectric substrate, a fourth electrode on a side, close to the first dielectric substrate, of the second dielectric substrate, a fourth bias voltage line electrically connected to the fourth electrode, and a second tunable dielectric layer between the third electrode and the fourth electrode; and a plurality of antenna units are organized to a plurality of second antenna sets juxtaposed in a fourth direction, wherein the antennas in the plurality of second antenna sets are juxtaposed in a third direction;

first electrodes in the first antenna units in the plurality of second antenna sets are connected to a same first bias voltage line, and third electrodes in the second antenna units in the plurality of second antenna sets are respectively connected to different third bias voltage lines; and second electrodes in the first antenna units in the plurality of second antenna sets are respectively connected to different second bias voltage lines, and fourth electrodes in the second antenna units in the plurality of second antenna sets are respectively connected to a same fourth bias voltage line.

In some embodiments, the different second bias voltage lines electrically connected to the second electrodes in the plurality of second antenna sets and the different third bias voltage lines electrically connected to the third electrodes in the plurality of second antenna sets are respectively disposed on two opposite sides of the plurality of second antenna sets in the fourth direction, routes of the different second bias voltage lines are matched with outer outlines of the second radiation structures, and routes of the different third bias voltage lines are matched with outer outlines of the first radiation structures.

Some embodiments of the present disclosure further provide an electronic device. The electronic device includes the antenna array in any of the above embodiments.

DETAILED DESCRIPTION

For clearer descriptions of the objects, technical solutions, and advantages of the embodiments of present disclosure, the present disclosure is described in detail hereinafter in combination with the accompanying drawings and the specific embodiments of the present disclosure.

Unless otherwise defined, technical or scientific terms used in the present disclosure shall have ordinary meaning understood by persons of ordinary skill in the art to which the disclosure belongs. The terms "first," "second," and the like used in the embodiments of the present disclosure are not intended to indicate any order, quantity or importance, but are merely used to distinguish the different components. The terms "a," "an," and the like are not intended to limit the quantity, and only represent that at least one exists. The terms "comprise" or "include" and the like are used to indicate that the element or object preceding the terms covers the element or object following the terms and its equivalents, and shall not be understood as excluding other elements or objects. The terms "connect" or "contact" and the like are not intended to be limited to physical or mechanical connections, but may include electrical connections, either direct or indirect connection. The terms "on," "under," "left," and "right" are only used to indicate the relative positional relationship. When the absolute position of the described object changes, the relative positional relationship may change accordingly.

A liquid crystal shifter is a phase-tunable shifter. An overlap capacitance is formed by loading a voltage on upper and lower substrates in the liquid crystal shifter, such that a dielectric constant of the liquid crystal material changes, and hence a phase constant of the electromagnetic wave in the device changes. Thus, an effect of tuning the phase-shifting degree is achieved, and a wavenumber scanning function of the antenna device is achieved. At present, common liquid crystal antennas are single polarized. The design of dual-polarized antennas is complex, and the layout of phase-shifting units and traces are considered. Thus, a dual-polarized antenna with simply structure and achievable is urgent.

Figure 1:
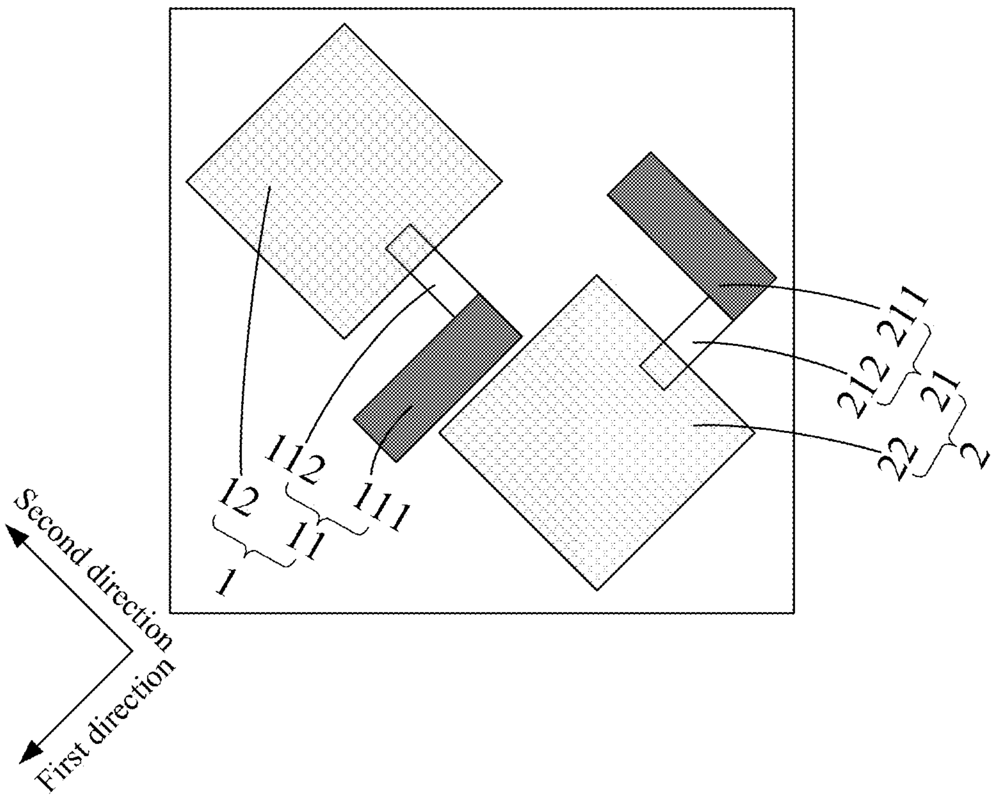
FIG. 1 is a top view of an antenna according to some embodiments of the present disclosure.

In a first aspect, FIG. 1 is a top view of an antenna according to some embodiments of the present disclosure. As shown in FIG. 1, the embodiments of the present disclosure provide an antenna. Specifically, the antenna is a dual-polarized antenna with different aperture, and includes a first antenna unit 1 and a second antenna unit 2. The first antenna unit 1 includes a first phase-tuning structure 11 and a first radiation structure 12, and the second antenna unit 2 includes a second phase-tuning structure and a second radiation structure 22. A first feed terminal 112 of the first phase-tuning structure 11 is electrically connected to the first radiation structure and feeds to the first radiation structure 12, and a first feed terminal 212 of the second phase-tuning structure 21 is electrically connected to the second radiation structure 22 and feeds to the second radiation structure 22. In the embodiments of the present disclosure, a feed direction of the first feed terminal 112 of the first phase-tuning structure 11 to the first radiation structure 12 is a first direction, a feed direction of the first feed terminal 212 of the second phase-tuning structure 21 to the second radiation structure 22 is a second direction, and the first direction is different from the second direction. That is, in the embodiments of the present disclosure, a polarization direction is achieved in the first antenna unit 1 in the antenna, and another polarization direction is achieved in the second antenna unit 2, such that the dual polarization is achieved in the antenna in the embodiments of the present disclosure.

The antenna in the embodiments of the present disclosure is any of a reflecting antenna, a transmitting antenna, and phased-array antenna, which is described in detail herein after.

Figure 2:
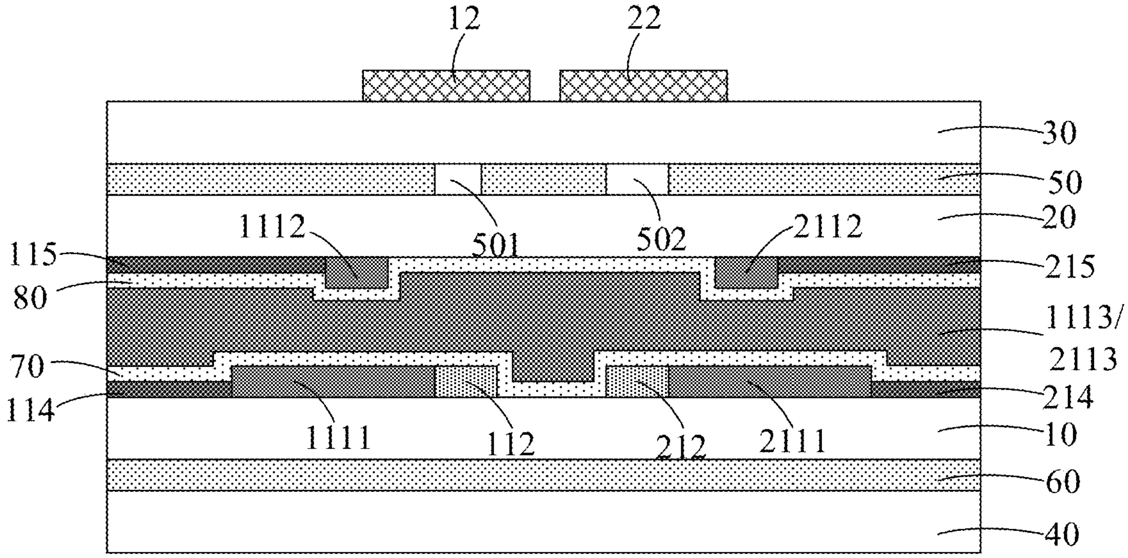
FIG. 2 is a section view of an antenna being a reflecting antenna according to some embodiments of the present disclosure.

In a first example, FIG. 2 is a section view of an antenna being a reflecting antenna according to some embodiments of the present disclosure. As shown in FIG. 2, in the case that the antenna is the reflecting antenna, the antenna not only includes the above first antenna unit 1 and second antenna unit 2, but also includes a first dielectric substrate 10, a second dielectric substrate 20, a first reference electrode layer 50, and a second reference electrode layer 60. The first phase-tuning structure 11 and the second phase-tuning structure 21 are disposed between the first dielectric substrate 10 and the second dielectric substrate 20. A first via 501 and a second via 502 are defined in the first reference electrode layer 50, the first reference electrode layer 50 is disposed on a side, facing away from the first dielectric substrate 10, of the second dielectric substrate 20, the first feed terminal 112 of the first phase-tuning structure 11 is electrically connected to the first radiation structure 12 through the first via 501, and the second phase-tuning structure 21 is electrically connected to the second radiation structure 22 through the second via 502. The second reference electrode is disposed on a side, facing away from the second dielectric substrate 20, of the first dielectric substrate 10 and used as a reflecting layer.

In this case, upon receiving the electromagnetic wave, the first radiation structure 12 in the first antenna unit 1 transmits the electromagnetic wave to the first feed terminal 112 of the first phase-tuning structure 11 through the first via 501 in the first reference electrode layer 50, the first phase-tuning structure 11 performs the phase-shifting modulation on the electromagnetic wave and then transmits to the reflecting layer, the reflecting layer reflects the electromagnetic wave to the first radiation structure 12, and the first radiation structure 12 radiates the electromagnetic wave performed with the phase-shifting modulation by the first phase-tuning structure 11. Similarly, upon receiving the electromagnetic wave, the second radiation structure 22 in the second antenna unit 2 transmits the electromagnetic wave to the first feed terminal 212 of the second phase-tuning structure 21 through the second via 502 in the first reference electrode layer, the second phase-tuning structure 21 performs the phase-shifting modulation on the electromagnetic wave and then transmits to the reflecting layer, the reflecting layer reflects the electromagnetic wave to the second radiation structure 22, and the second radiation structure 22 radiates the electromagnetic wave performed with the phase-shifting modulation by the second phase-tuning structure 21.

Furthermore, the reflecting antenna further includes a third dielectric substrate 30 and a fourth dielectric substrate 40. The third dielectric substrate 30 is disposed on a side, facing away from the second dielectric substrate 20, of the first dielectric substrate 50, and the fourth dielectric substrate 40 is disposed on a side, facing away from the first dielectric substrate 10, of the second reference electrode layer 60. In this case, the first radiation structure 12 and the second radiation structure 22 are disposed on the third dielectric substrate 30, for example, on a side, facing away from the second dielectric substrate 20, of the third dielectric substrate 30. In some embodiments, the second reference electrode layer 60 is disposed on the fourth dielectric substrate 40 and is attached to the first dielectric substrate 10.

Figure 3:
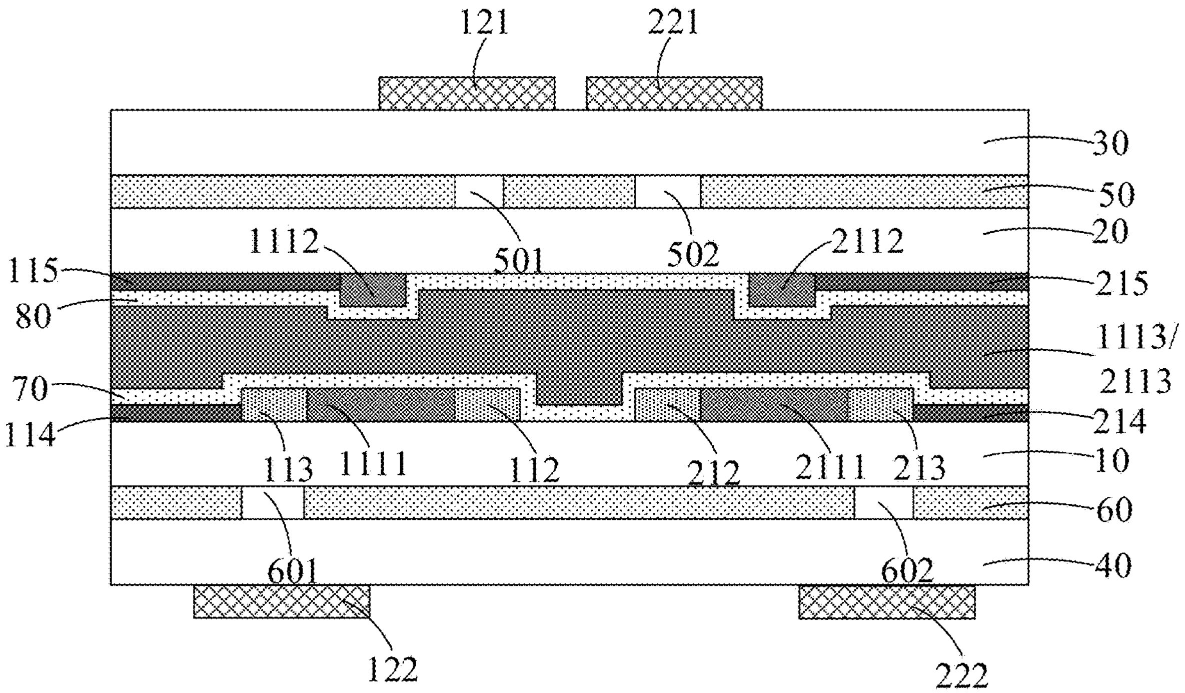
FIG. 3 is a section view of an antenna being a transmitting antenna according to some embodiments of the present disclosure.

In a second example, FIG. 3 is a section view of an antenna being a transmitting antenna according to some embodiments of the present disclosure. As shown in FIG. 3, in the case that the antenna is the transmitting antenna, the antenna not only includes the first antenna unit 1 and the second antenna unit 2, but also includes a first reference electrode layer 50, a second reference electrode layer 60, a first dielectric substrate 10, a second dielectric substrate 20, a third dielectric substrate 30, and a fourth dielectric substrate 40. Each of the first radiation structure 12 in the first antenna unit 1 and the second radiation structure 22 in the second antenna unit 2 includes a first radiation portion and a second radiation portion, and the second radiation structure 22 in the second antenna unit 2 includes a third radiation portion and a fourth radiation portion. The first phase-tuning structure 11 and the second phase-tuning structure 21 are disposed between the first dielectric substrate 10 and the second dielectric substrate 20. The first reference electrode layer 50 is disposed on a side, facing away from the first dielectric substrate 10, of the second dielectric substrate 20, and a first via 501 and a second via 502 are defined in the first reference electrode layer 50. The third dielectric substrate 30 is disposed on a side, facing away from the second dielectric substrate 20, of the first reference electrode layer 50. The first radiation portion of the first radiation structure 12 and the second radiation portion of the second radiation structure 22 are disposed on a side, facing away from the first reference electrode layer 50, of the third dielectric substrate 30. The second reference electrode layer 60 is disposed on a side, facing away from the second dielectric substrate 20, of the first dielectric substrate 10, and a third via 601 and a fourth via 602 are defined in the second reference electrode layer 60. The fourth dielectric substrate 40 is disposed on a side, facing away from the first dielectric substrate 10, of the second reference electrode layer 60, and the second radiation portion of the first radiation structure 12 and the second radiation portion of the second radiation structure 22 are disposed on a side, facing away from the second reference electrode layer 60, of the fourth dielectric substrate 40. The first feed terminal 112 of the first phase-tuning structure 11 is electrically connected to the first radiation portion of the first radiation structure 12 through the first via 501, and the second feed terminal 113 of the first phase-tuning structure 11 is electrically connected to the second radiation portion of the first radiation structure 12 through the third via 601. The first feed terminal 212 of the second phase-tuning structure 21 is electrically connected to the first radiation portion of the second radiation structure 22 through the second via 502, and the second feed terminal 213 of the second phase-tuning structure 21 is electrically connected to the second radiation portion of the second radiation structure 22 through the fourth via 602.

In this case, one of the first radiation portion and the second radiation portion of the first radiation structure 12 in the first antenna unit 1 is configured to receive the electromagnetic wave, and the other of the first radiation portion and the second radiation portion is configured to radiate the electromagnetic wave. Similarly, one of the first radiation portion and the second radiation portion of the second radiation structure 22 in the second antenna unit 2 is configured to receive the electromagnetic wave, and the other of the first radiation portion and the second radiation portion is configured to radiate the electromagnetic wave. By taking the first radiation portion in the first radiation portion and the second radiation portion of the first radiation structure 12 being configured to radiate the electromagnetic wave, and the second radiation portion in the first radiation portion and the second radiation portion of the first radiation structure 12 being configured to receive the electromagnetic wave as an example, the second radiation portion of the first radiation structure 12 in the first antenna unit 1 transmits the received electromagnetic wave to the second feed terminal 113 of the first phase-tuning structure 11 through the third via 601, the first phase-tuning structure 11 performs the phase-shifting modulation on the electromagnetic wave and then transmits to the first radiation portion of the first radiation structure 12 by passing through the first feed terminal and the first via 501. Similarly, the second radiation portion of the second radiation structure 22 in the second antenna unit transmits the received electromagnetic wave to the second feed terminal 213 of the second phase-tuning structure 21 through the fourth via 602, the second phase-tuning structure 21 performs the phase-shifting modulation on the electromagnetic wave and then transmits to the first radiation portion of the second radiation structure 12 by passing through the first feed terminal and the second via 502.

Figure 4:
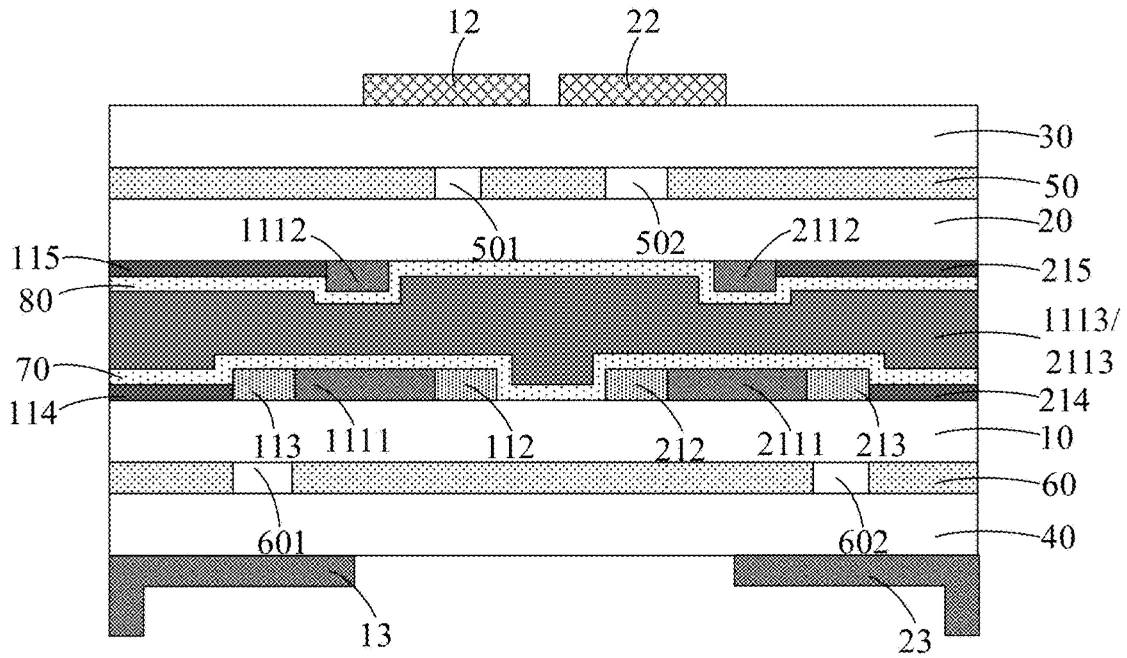
FIG. 4 is a section view of an antenna being a phased-array antenna according to some embodiments of the present disclosure.

In a third example, FIG. 4 is a section view of an antenna being a phased-array antenna according to some embodiments of the present disclosure. As shown in FIG. 4, in the case that the antenna is the phased-array antenna, the antenna not only includes the first antenna unit 1 and the second antenna unit 2, but also includes a first reference electrode layer 50, a second reference electrode layer 60, a first feed source 13, a second feed source 23, a first dielectric substrate 10, a second dielectric substrate 20, a third dielectric substrate 30, and a fourth dielectric substrate 40. The first phase-tuning structure 11 and the second phase-tuning structure 21 are disposed between the first dielectric substrate 10 and the second dielectric substrate 20. The first reference electrode layer 50 is disposed on a side, facing away from the first dielectric substrate 10, of the second dielectric substrate 20, and a first via 501 and a second via 502 are defined in the first reference electrode layer 50. The third dielectric substrate 30 is disposed on a side, facing away from the second dielectric substrate 20, of the first reference electrode layer 50. The first radiation portion and the second radiation portion are disposed on a side, facing away from the first reference electrode layer 50, of the third dielectric substrate 30. The second reference electrode layer 60 is disposed on a side, facing away from the second dielectric substrate 20, of the first dielectric substrate 10, and a third via 601 and a fourth via 602 are defined in the second reference electrode layer 60. The fourth dielectric substrate 40 is disposed on a side, facing away from the first dielectric substrate 10, of the second reference electrode layer 60, and the first feed source 13 and the second feed source 23 are disposed on a side, facing away from the second reference electrode layer 60, of the fourth dielectric substrate 40. The first feed terminal 112 of the first phase-tuning structure 11 is electrically connected to the first radiation structure 12 through the first via 501, and the second feed terminal 113 of the first phase-tuning structure 11 is electrically connected to the first feed source 13 through the third via 601. The first feed terminal 212 of the second phase-tuning structure 21 is electrically connected to the second radiation structure 22 through the second via 502, and the second feed terminal 213 of the second phase-tuning structure 21 is electrically connected to the second feed source 23 through the fourth via 602.

In this case, the first feed source 13 feeds the electromagnetic wave to the second feed terminal 113 of the first phase-tuning structure 11 in the first antenna unit 1 through the third via 601, the first phase-tuning structure 11 performs the phase-shifting modulation on the electromagnetic wave and then transmits to the first radiation structure 12 by passing through the first feed terminal and the first via 501, and the first radiation structure 12 radiates the electromagnetic wave performed with the phase-shifting modulation. Similarly, the second feed source 23 feeds the electromagnetic wave to the second feed terminal 213 of the second phase-tuning structure 21 in the second antenna unit 2 through the fourth via 602, the second phase-tuning structure 21 performs the phase-shifting modulation on the electromagnetic wave and then transmits to the second radiation structure 22 by passing through the first feed terminal and the second via 502, and the second radiation structure 22 radiates the electromagnetic wave performed with the phase-shifting modulation.

In some embodiments of the present disclosure, the first phase-tuning structure 11 and the second phase-tuning structure 21 are shifters, for example, liquid crystal shifters. Specifically, the first phase-tuning structure 11 includes a first transmitting unit, a second transmitting unit, and a first phase-shifting unit 111 between the first transmitting unit and the second transmitting unit, and the second phase-tuning structure 21 includes a third transmitting unit, a fourth transmitting unit, and a second phase-shifting unit 211 between the third transmitting unit and the fourth transmitting unit.

The first phase-shifting unit 111 in the first phase-tuning structure 11 includes a first electrode 1111, a second electrode 1112, and a first tunable dielectric layer 1113. The first electrode 1111 is disposed on a side, close to the second dielectric substrate 20, of the first dielectric substrate 10, the second electrode 1112 is disposed on a side, close to the first dielectric substrate 10, of the second dielectric substrate 20, and the first tunable dielectric layer 1113 is disposed between the first electrode 1111 and the second electrode 1112. The second phase-shifting unit 211 in the second phase-tuning structure 21 includes a third electrode 2111, a fourth electrode 2112, and a second tunable dielectric layer 2113. The third electrode 2111 is disposed on a side, close to the second dielectric substrate 20, of the first dielectric substrate 10, the fourth electrode 2112 is disposed on a side, close to the first dielectric substrate 10, of the second dielectric substrate 20, and the second tunable dielectric layer 2113 is disposed between the third electrode 2111 and the fourth electrode 2112. In the case that the first phase-tuning structure 11 and the second phase-tuning structure 21 are liquid crystal shifters, the first tunable dielectric layer 1113 and the second tunable dielectric layer 2113 are liquid crystal layers. In this case, the first tunable dielectric layer 1113 and the second tunable dielectric layer 2113 are of an integrated structure.

By taking a layer of the first electrode 1111 in the first phase-shifting unit 111 including a first transmitting line and a second transmitting line that are juxtaposed, and a layer of the second electrode 1112 in the first phase-shifting unit 111 including a plurality of first patch electrodes juxtaposed in an extension direction of the first transmitting line/the second transmitting line as an example, the first transmitting unit and the second transmitting unit are power dividers for dividing one to two, for example, the balun. In this case, a main circuit of the first transmitting unit is used as the first feed terminal 112 of the first phase-tuning structure 11, and two branch circuits are respectively connected to the first transmitting line and the second transmitting line. A main circuit of the second transmitting unit is used as the second feed terminal of the first phase-tuning structure 11, and two branch circuits are respectively connected to the first transmitting line and the second transmitting line. Similarly, by taking a layer of the third electrode 2111 in the second phase-shifting unit 211 including a first transmitting line and a second transmitting line that are juxtaposed, and a layer of the fourth electrode 2112 in the second phase-shifting unit 211 including a plurality of first patch electrodes juxtaposed in an extension direction of the first transmitting line/the second transmitting line as an example, the third transmitting unit and the fourth transmitting unit are power dividers for dividing one to two, for example, the balun. In this case, a main circuit of the third transmitting unit is used as the first feed terminal 212 of the second phase-tuning structure 21, and two branch circuits are respectively connected to the first transmitting line and the second transmitting line. A main circuit of the fourth transmitting unit is used as the second feed terminal of the second phase-tuning structure 21, and two branch circuits are respectively connected to the first transmitting line and the second transmitting line.

It should be noted that film layer structures of the first antenna unit 1 and the second antenna unit 2 in the embodiments of the present disclosure are the same for convenience of arrangement.

Furthermore, a first bias voltage line 114 supplies a bias voltage to the first electrode 1111 in the first phase-tuning structure 11, and a second bias voltage line 115 supplies a bias voltage to the second electrode 1112. The first bias voltage line 114 is disposed on a side, close to the first dielectric substrate 10, of the first electrode 1111 and is directly connected to the first electrode 1111, and the second bias voltage line 115 is disposed on a side, close to the second dielectric substrate 20, of the second electrode 1112. A first insulative layer 70 is disposed on a side, close to the liquid crystal layer, of the layer of the first electrode 1111 and the third electrode 2111, and a second insulative layer 80 is disposed on a side, close to the liquid crystal layer, of the layer of the second electrode 1112 and the fourth electrode 2112.

Figure 5:
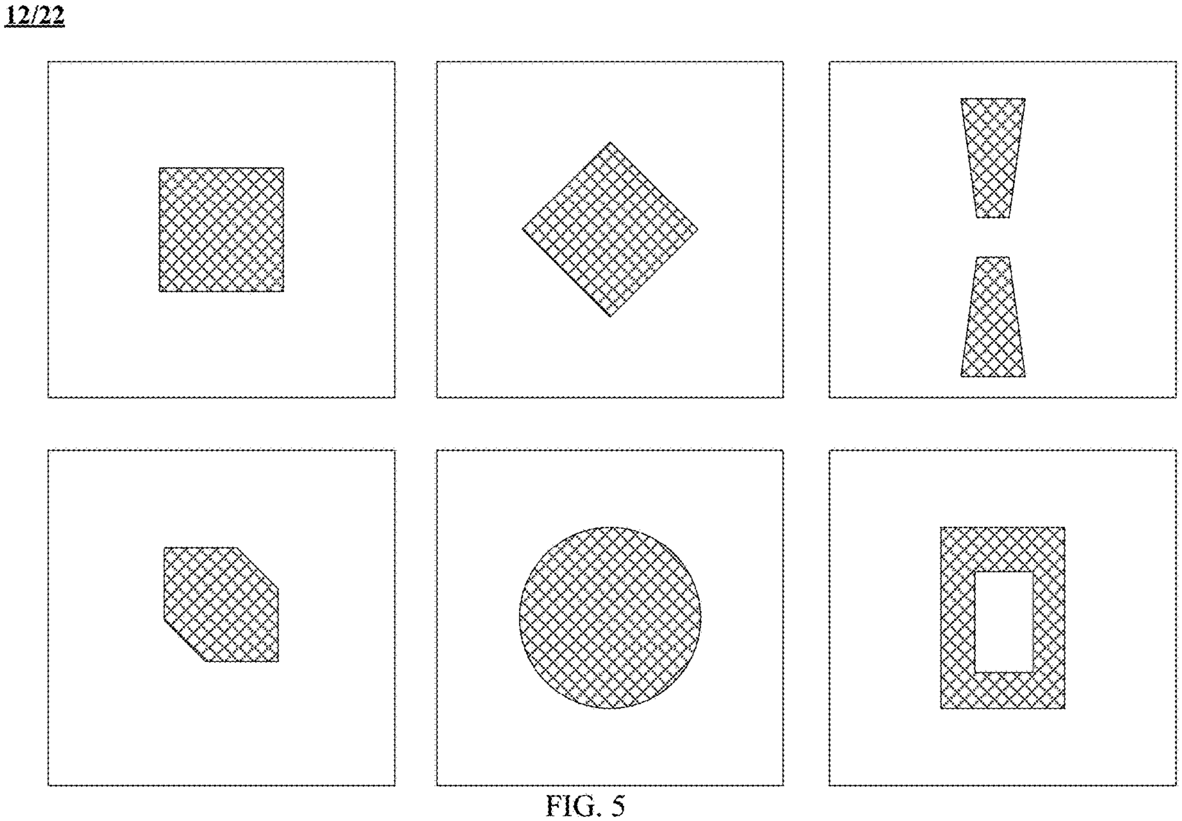
FIG. 5 is a top view of a first radiation structure/second radiation structure of an antenna according to some embodiments of the present disclosure.

In some embodiments, FIG. 5 is a top view of a first radiation structure 12/second radiation structure 22 of an antenna according to some embodiments of the present disclosure. As shown in FIG. 5, the first radiation structure 12 and the second radiation structure 22 in the embodiments of the present disclosure are radiation patches, monopole antennas, and the like. The embodiments of the present disclosure are described by taking the first radiation structure 12 and the second radiation structure 22 being the radiation patches as an example. The radiation patches are in various shapes, such as, a square shape, a diamond shape, a butterfly shape, a hexagon shape, a circle shape, a ring shape, and the like, and are used to provide polarizations with various properties and performances. The embodiments of the present disclosure are described by taking the first radiation structure 12 and the second radiation structure 22 being in the square shape as an example.

Furthermore, lengths and widths of the first radiation structure 12 and the second radiation structure 22 range from 0.12 to 12, and λ represents an operating frequency wavelength. The first radiation structure 12 and the second radiation structure 22 are of a single layer conductive structure or a composed-film-layer structure. For example, the first radiation structure 12 and the second radiation structure 22 are formed by laminating a base material and conductive film layer.

Figure 6:
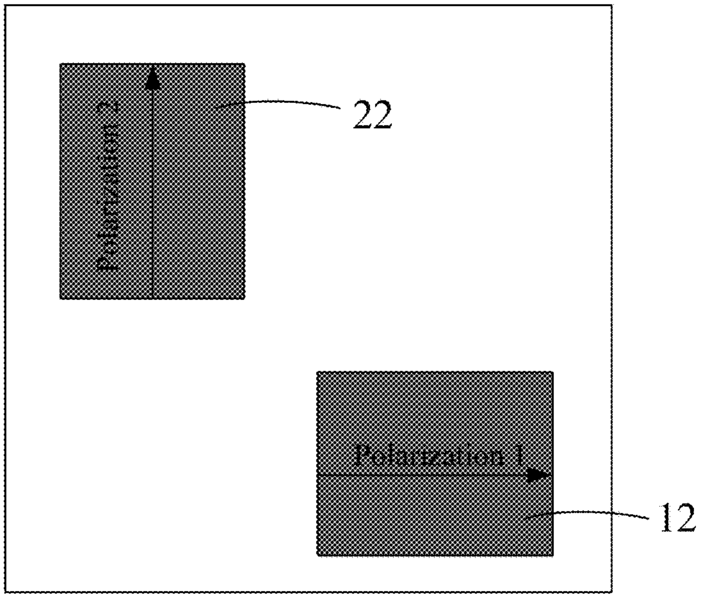
FIG. 6 is a schematic diagram of polarization of an antenna according to some embodiments of the present disclosure.
Figure 7:
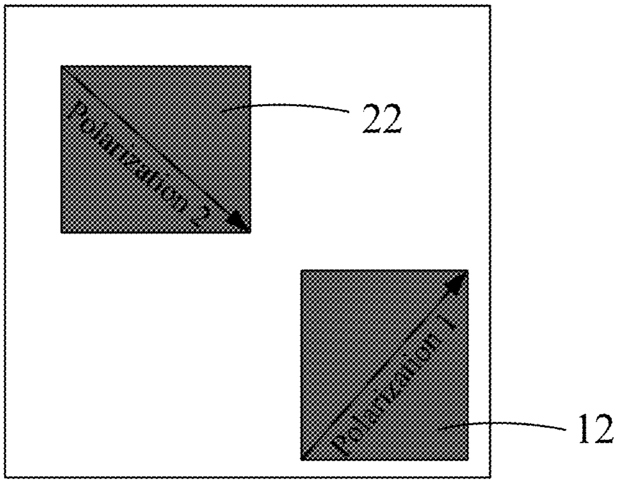
FIG. 7 is a schematic diagram of polarization of an antenna according to some embodiments of the present disclosure.
Figure 8:
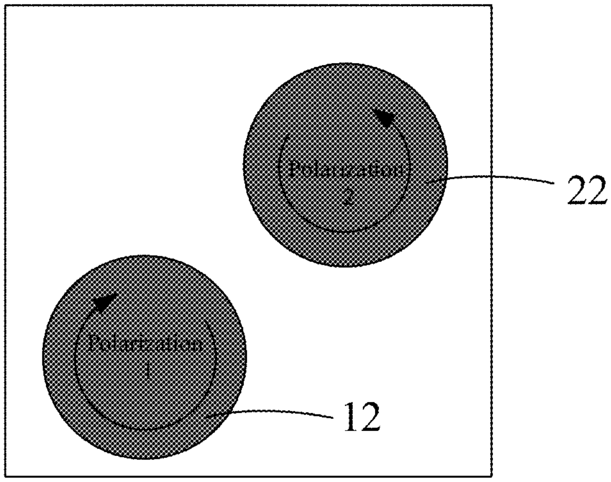
FIG. 8 is a schematic diagram of polarization of an antenna according to some embodiments of the present disclosure.

In some embodiments, FIG. 6 is a schematic diagram of polarization of an antenna according to some embodiments of the present disclosure. FIG. 7 is a schematic diagram of polarization of an antenna according to some embodiments of the present disclosure. FIG. 8 is a schematic diagram of polarization of an antenna according to some embodiments of the present disclosure. As shown in FIG. 6 to FIG. 8, in the case that the outline of the antenna is a quadrangle, and the first radiation structure 12 and the second radiation structure 22 are respectively on two diagonal positions, one of the first radiation structure 12 and the second radiation structure 22 is acquired by rotating and overturning the other of the first radiation structure 12 and the second radiation structure 22. Referring to FIG. 1, for example, in the case that the first antenna unit 1 rotates by a predetermined angle and overturns by 180°, the first feed terminal 112 of the first phase-tuning structure 11 in the first antenna unit 1 is coincident with the first feed terminal 212 of the second phase-tuning structure 21 in the second antenna unit 2, and the first radiation structure in the first antenna unit 1 is coincident with the second radiation structure in the second antenna unit 2. Specifically, by taking the first direction being perpendicular to the second direction as an example, referring to FIG. 1, the first antenna unit 1 counterclockwise rotates by 90° and overturns by 180°, such that the first feed terminal 112 of the first phase-tuning structure 11 in the first antenna unit 1 is coincident with the first feed terminal 212 of the second phase-tuning structure 21 in the second antenna unit 2, and the first radiation structure in the first antenna unit 1 is coincident with the second radiation structure in the second antenna unit 2.

Figure 9:
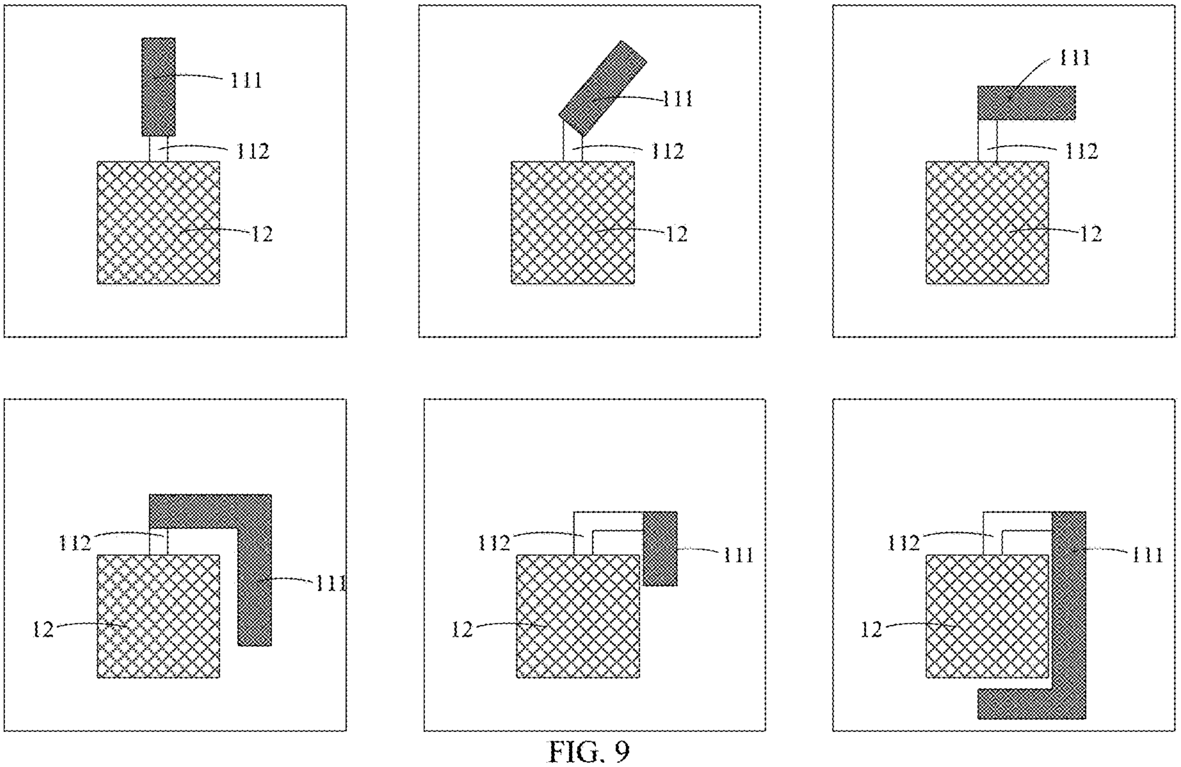
FIG. 9 is a schematic diagram of relative positions of a first radiation structure and a first phase-shifting unit of an antenna according to some embodiments of the present disclosure.

In some embodiments, FIG. 9 is a schematic diagram of relative positions of a first radiation structure and a first phase-shifting unit of an antenna according to some embodiments of the present disclosure. As shown in FIG. 9, the first phase-shifting unit 111 in the first phase-tuning structure 11 in the first antenna unit 1 is parallel to, perpendicular to, tangential, or bent relative to the first radiation structure 12, such that the first feed terminal 112 of the first phase-tuning structure 11 is electrically connected to the first radiation structure 12. Similarly, the second phase-shifting unit 211 in the second phase-tuning structure 21 in the second antenna unit 2 is parallel to, perpendicular to, tangential, or bent relative to the second radiation structure 22, such that the first feed terminal 212 of the second phase-tuning structure 21 is electrically connected to the second radiation structure 22.

Figure 10:
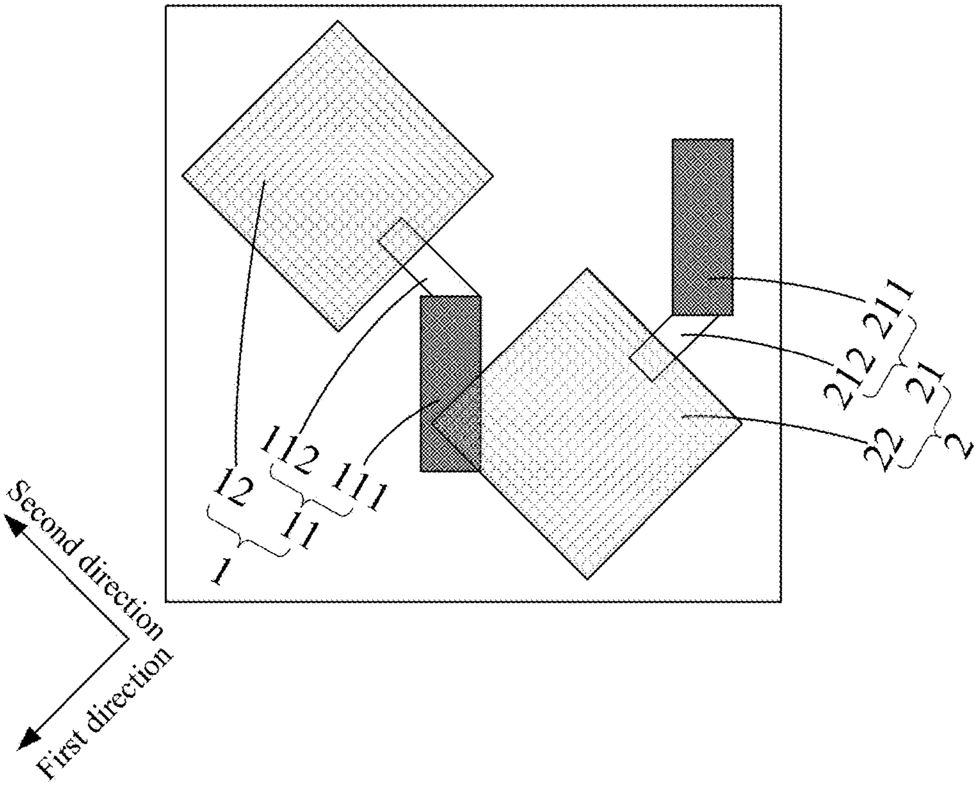
FIG. 10 is a top view of an antenna according to some embodiments of the present disclosure.
Figure 11:
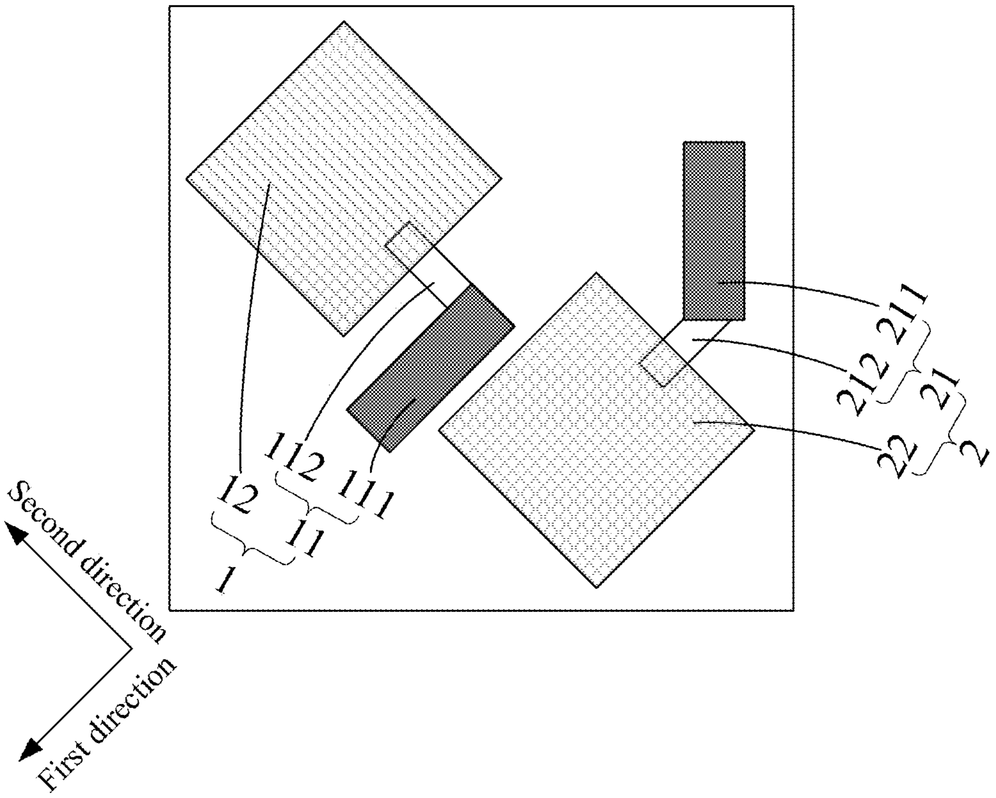
FIG. 11 is a top view of an antenna according to some embodiments of the present disclosure.

Furthermore, the relative positions of the first radiation structure 12 and the first phase-shifting unit 111 in the first antenna unit 1 are the same as the relative positions of the second radiation structure 22 and the second phase-shifting unit 211 in the second antenna unit 2. For example, referring to FIG. 1, the first radiation structure 12 and the first phase-shifting unit 111 in the first antenna unit 1 are parallel to each other, and the second radiation structure 22 and the second phase-shifting unit 211 in the second antenna unit 2 are also parallel to each other. For example, FIG. 10 is a top view of an antenna according to some embodiments of the present disclosure. As shown in FIG. 10, the first radiation structure 12 in the first antenna unit 1 is tangential relative to the first phase-shifting unit 111 in the first antenna unit 1, and the second radiation structure 22 in the second antenna unit 2 is also tangential relative to the second phase-shifting unit 211 in the second antenna unit 2. In some embodiments, the relative positions of the first radiation structure 12 and the first phase-shifting unit 111 in the first antenna unit 1 are different from the relative positions of the second radiation structure 22 and the second phase-shifting unit 211 in the second antenna unit 2. For example, FIG. 11 is a top view of an antenna according to some embodiments of the present disclosure. As shown in FIG. 11, the first radiation structure 12 and the first phase-shifting unit 111 in the first antenna unit 1 are parallel to each other, and the second radiation structure 22 in the second antenna unit 2 is tangential relative to the second phase-shifting unit 211 in the second antenna unit 2.

In some embodiments, the antenna not only includes the above structure, but also includes a first dielectric substrate 10 and a second dielectric substrate 20 that are opposite to each other. The first phase-tuning structure 11 and the second phase-tuning structure 21 are disposed between the first dielectric substrate 10 and the second dielectric substrate 20, an orthographic projection of the first radiation structure 12 on the first dielectric substrate 10 is a first pattern, and an orthographic projection of the second radiation structure 22 on the first dielectric substrate 10 is a second pattern. An orthographic projection of the first phase-tuning structure 11 on the first dielectric substrate 10 is at least partially disposed between the first pattern and the second pattern, or an orthographic projection of the second phase-tuning structure 21 on the first dielectric substrate 11 is at least partially disposed between the first pattern and the second pattern, such that the miniaturization of antennas is achieved.

In a second aspect, the embodiments of the present disclosure further provide an antenna array. The antenna array includes a plurality of antenna units in the above embodiments. The antenna array in the embodiments of the present disclosure is illustrated in conjunction with the arrangement of the antennas in the antenna array hereinafter.

The following examples are described by taking the first antenna unit 1 rotating by a predetermined angle and overturning by 180°, the first feed terminal 112 of the first phase-tuning structure 11 in the first antenna unit 1 being coincident with the first feed terminal 212 of the second phase-tuning structure 21 in the second antenna unit 2, the first radiation structure in the first antenna unit 1 being coincident with the second radiation structure in the second antenna unit 2, the first radiation structure 12 and the first phase-shifting unit 111 in the first antenna unit 1 being parallel to each other, and the second radiation structure 22 and the second phase-shifting unit 211 in the second antenna unit 2 being also parallel to each other as an example.

Figure 12:
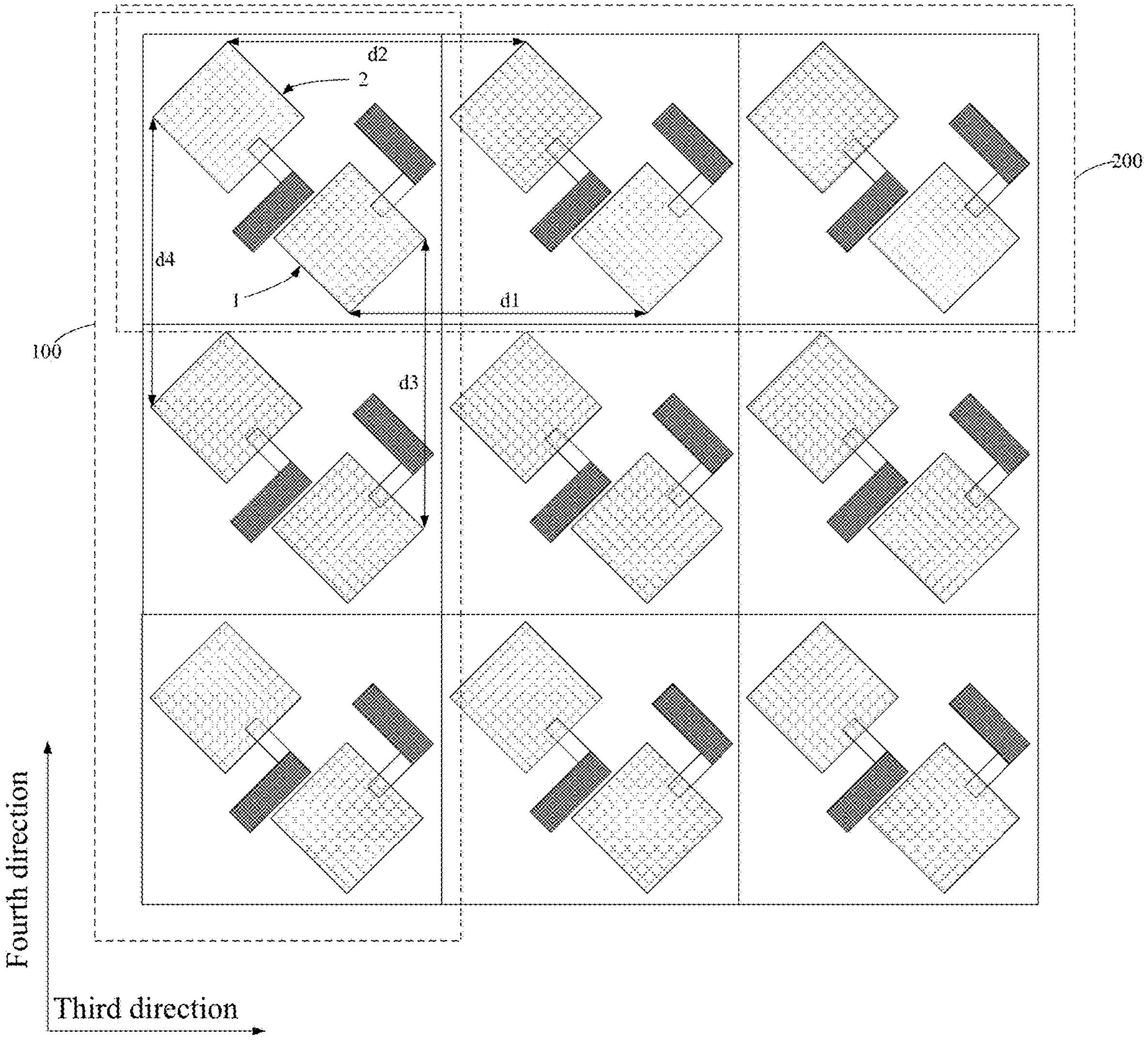
FIG. 12 is a schematic diagram of a first example of an antenna array according to some embodiments of the present disclosure.

In a first example, FIG. 12 is a schematic diagram of a first example of an antenna array according to some embodiments of the present disclosure. As shown in FIG. 12, a plurality of antennas are organized to a plurality of first antenna sets 100 juxtaposed in a third direction and a plurality of second antenna sets 200 juxtaposed in a fourth direction. The antennas in the plurality of first antenna sets 100 are juxtaposed in the fourth direction, and the antennas in the plurality of second antenna sets 200 are juxtaposed in the third direction. A distance between the first radiation structures 12 in the antennas adjacent in the third direction is a first distance d1, a distance between the second radiation structures 22 in the antennas adjacent in the third direction is a second distance d2, and the first distance d1 is equal to the second distance d2. In some embodiments, a distance between the first radiation structures 12 in the antennas adjacent in the fourth direction is a third distance d3, a distance between the second radiation structures 22 in the antennas adjacent in the fourth direction is a fourth distance d4, and the third distance d3 is equal to the fourth distance d4, such that the antennas are arranged closely, and the miniaturization of antenna array is achieved.

Figure 13:
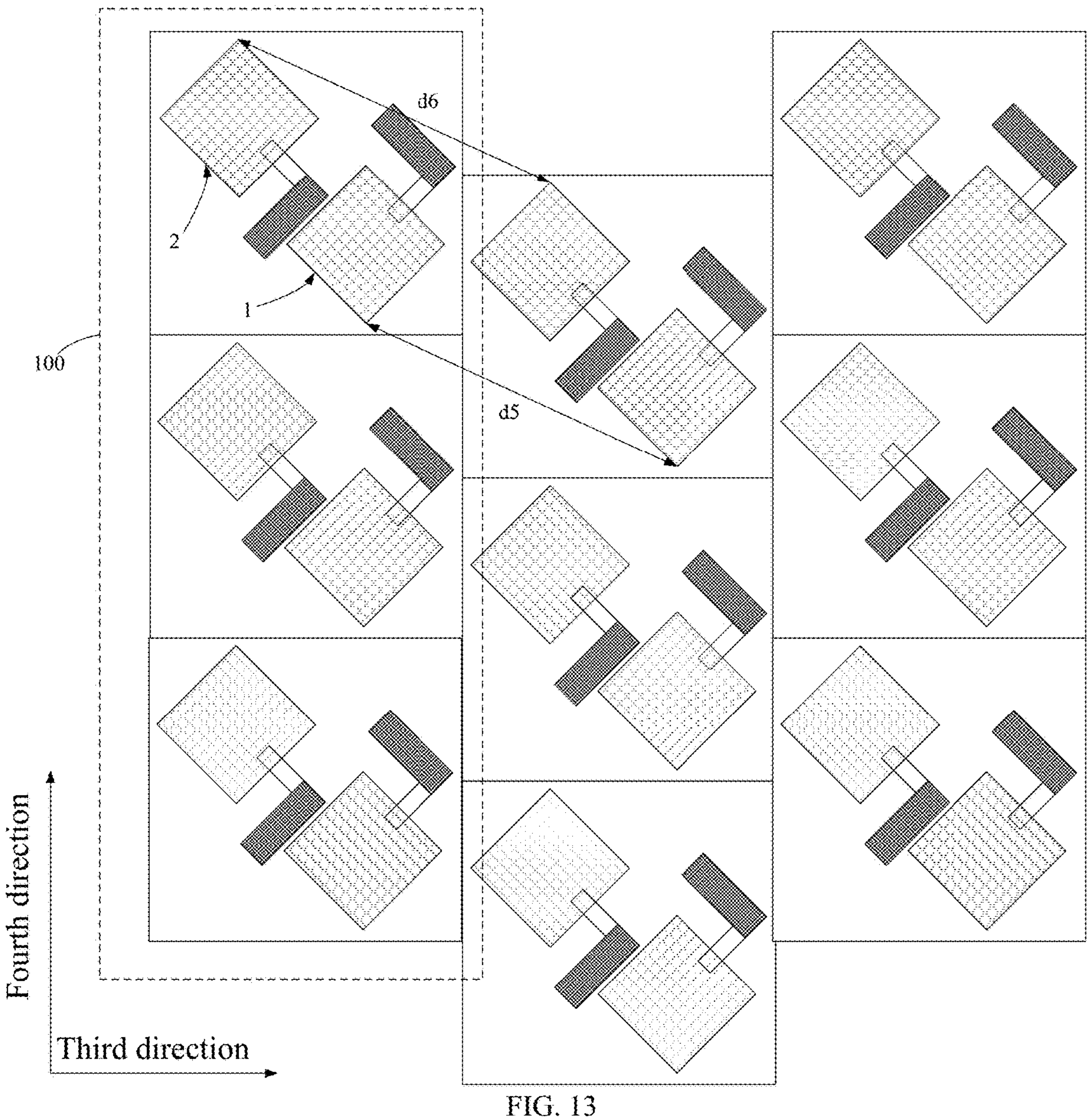
FIG. 13 is a schematic diagram of a second example of an antenna array according to some embodiments of the present disclosure.

In a second example, FIG. 13 is a schematic diagram of a second example of an antenna array according to some embodiments of the present disclosure. As shown in FIG. 13, a plurality of antenna units are organized to a plurality of first antenna sets 100 juxtaposed in a third direction, the antennas in the plurality of first antenna sets 100 are juxtaposed in a fourth direction, and adjacent first antenna sets 100 in the plurality of first antenna sets 100 are offset. For two antennas in the adjacent first antenna sets 100 with a same order, a distance between two first radiation structures 12 in the two antennas is a fifth distance d5, a distance between two second radiation structures 22 in the two antennas is a sixth distance d6, and the fifth distance d5 is equal to the sixth distance d6, such that the antennas are arranged closely, and the miniaturization of antenna array is achieved.

In some embodiments, the first bias voltage lines 114 connected to the first electrodes 1111 in the first antenna units 1 in the antenna array and the third bias voltage lines 214 connected to the third electrodes 2111 in the second antenna units 2 in the antenna array are disposed on the same layer or different layers. Similarly, the second bias voltage lines 115 connected to the second electrodes 1112 in the first antenna units 1 in the antenna array and the fourth bias voltage lines 215 connected to the fourth electrodes 2112 in the second antenna units 2 in the antenna array are disposed on the same layer or different layers.

In the case that the first bias voltage lines 114 connected to the first electrodes 1111 in the first antenna units 1 in the antenna array and the third bias voltage lines 214 connected to the third electrodes 2111 in the second antenna units 2 in the antenna array are disposed on the same layer, and the second bias voltage lines 115 connected to the second electrodes 1112 in the first antenna units 1 in the antenna array and the fourth bias voltage lines 215 connected to the fourth electrodes 2112 in the second antenna units 2 in the antenna array are disposed on the same layer, the wirings in the antenna array is reduced by the following wiring modes. The following wiring examples are only described by taking the antennas in the antenna array being arranged in the arrangement mode shown in FIG. 12 as an example.

Figure 14:
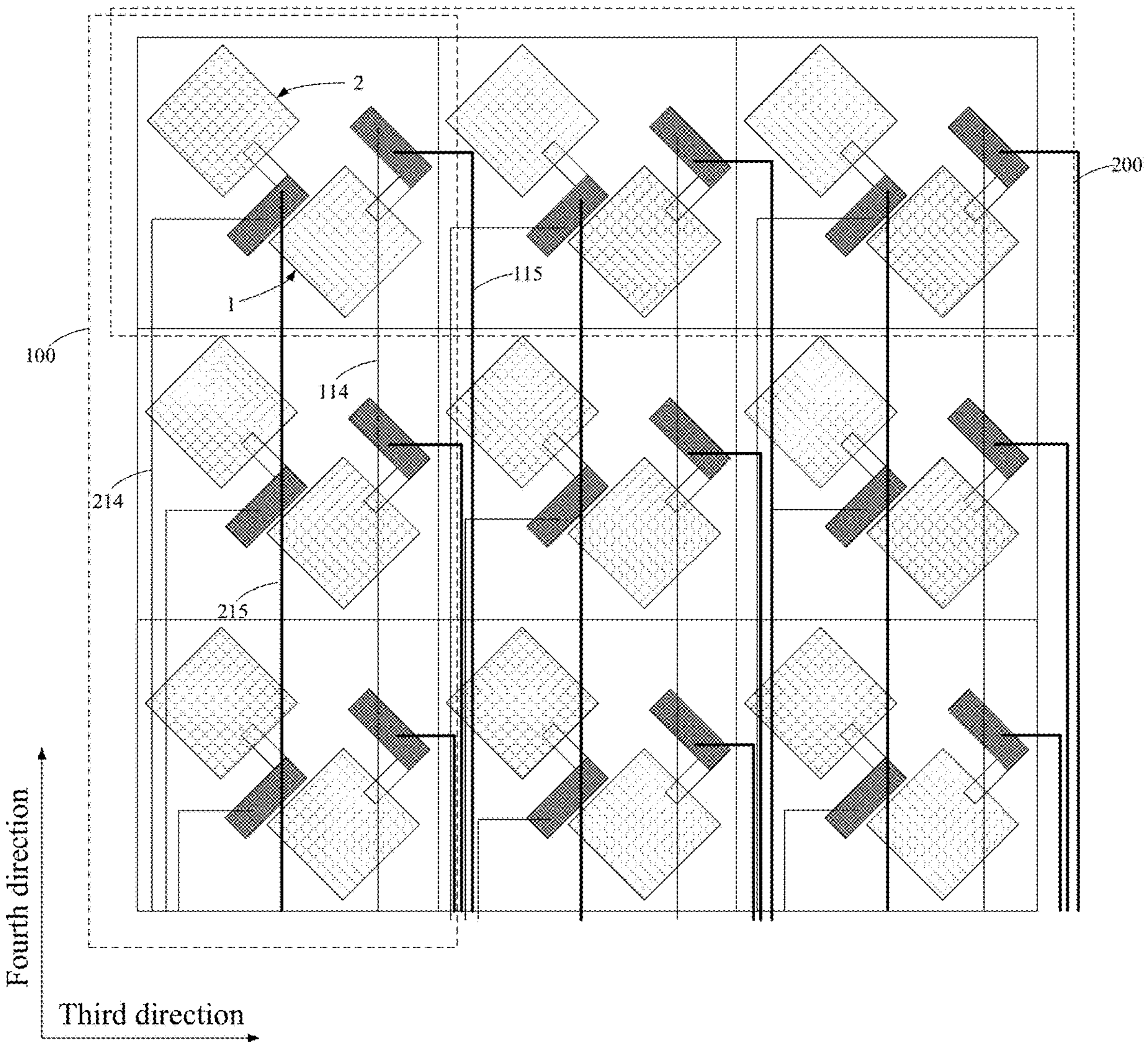
FIG. 14 is a schematic diagram of wiring of the antenna array in the first example according to some embodiments of the present disclosure.

In a first example, FIG. 14 is a schematic diagram of wiring of the antenna array in the first example according to some embodiments of the present disclosure. As shown in FIG. 14, in the first antenna set 100, the first electrodes 1111 in the first antenna units 1 are electrically connected to the same first bias voltage line 114, the third electrodes 2111 in the second antenna units 2 are respectively connected to different third bias voltage lines 214, the second electrodes 1112 in the first antenna units 1 are respectively connected to different second bias voltage lines 115, and the fourth electrodes 2112 in the second antenna units 2 are respectively connected to a same fourth bias voltage line 215.

Figure 15:
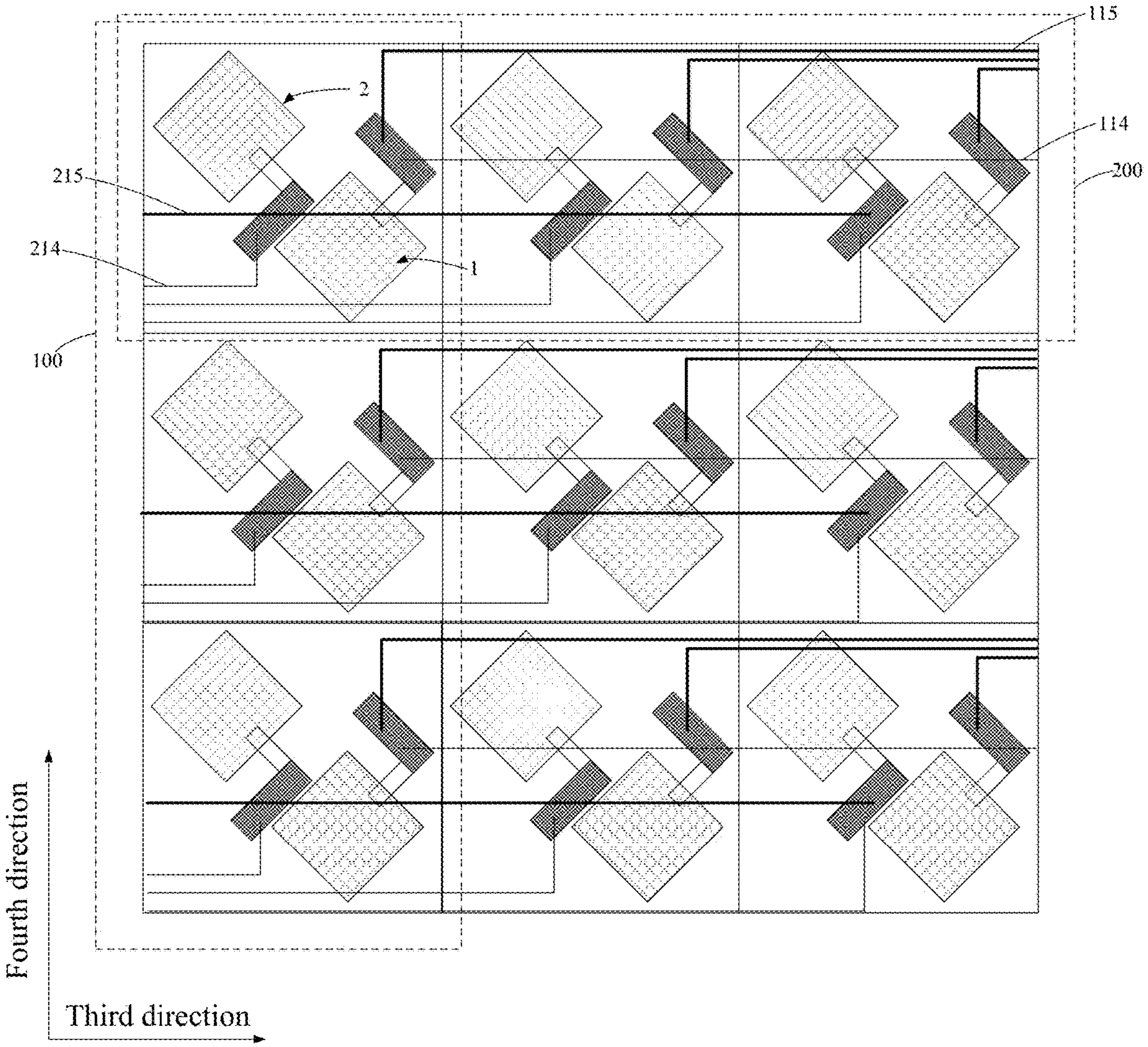
FIG. 15 is a schematic diagram of wiring of the antenna array in the second example according to some embodiments of the present disclosure.

In a second example, FIG. 15 is a schematic diagram of wiring of the antenna array in the second example according to some embodiments of the present disclosure. As shown in FIG. 15, in the second antenna set 200, the first electrodes 1111 in the first antenna units 1 are electrically connected to the same first bias voltage line 114, the third electrodes 2111 in the second antenna units 2 are respectively connected to different third bias voltage lines 214, the second electrodes 1112 in the first antenna units 1 are respectively connected to different second bias voltage lines 115, and the fourth electrodes 2112 in the second antenna units 2 are respectively connected to a same fourth bias voltage line 215.

Figure 16:
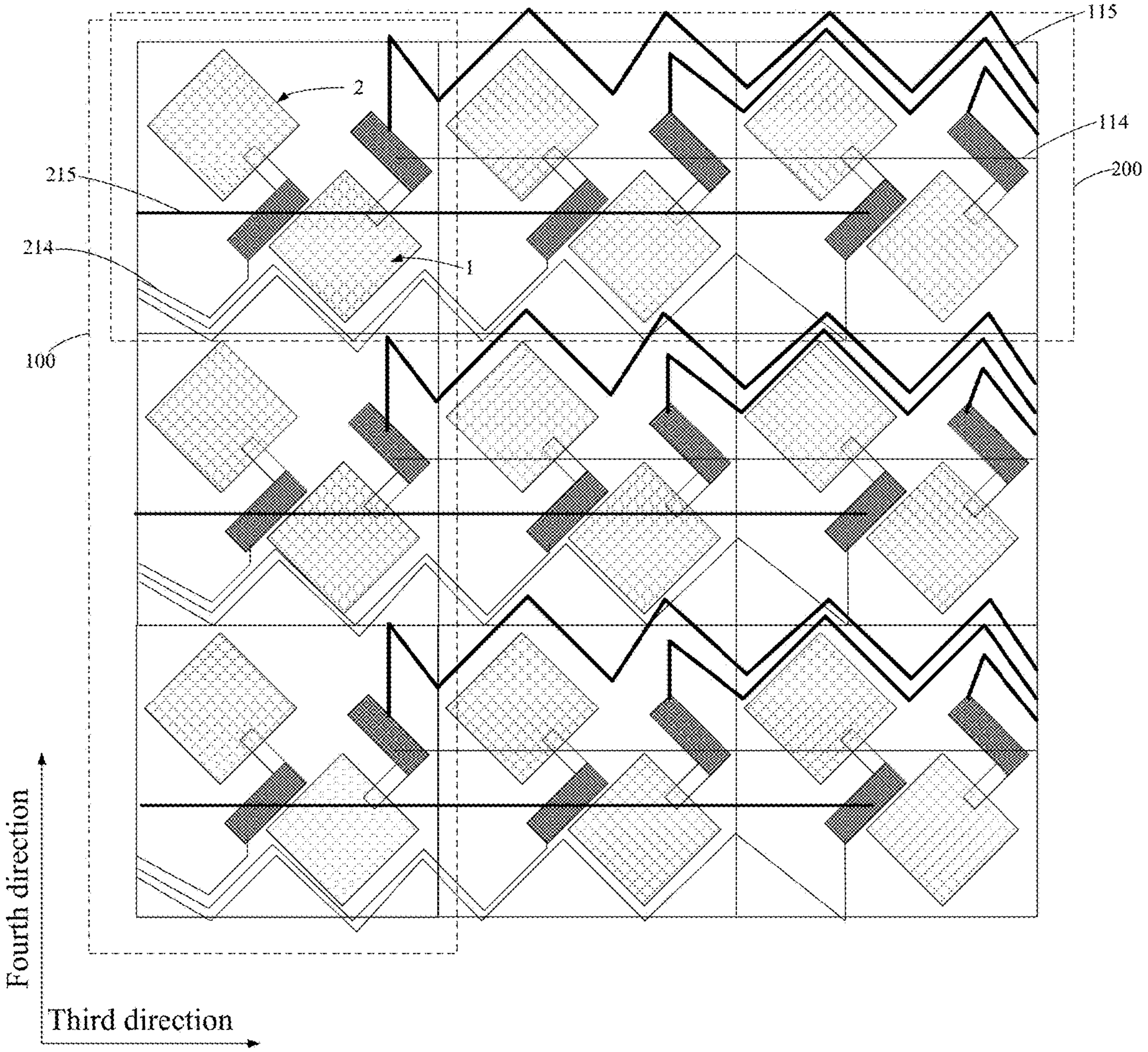
FIG. 16 is a schematic diagram of wiring of an antenna array in a third example according to some embodiments of the present disclosure.

In a third example, FIG. 16 is a schematic diagram of wiring of the antenna array in the third example according to some embodiments of the present disclosure. As shown in FIG. 16, the example shown in FIG. 16 and the second example are approximately the same, and only differ in that: the different second bias voltage lines 115 electrically connected to the second electrodes 1112 in the second antenna sets 200 and the different third bias voltage lines 214 electrically connected to the third electrodes 2111 in the second antenna sets 200 are respectively disposed on two opposite sides of the second antenna sets 200 in the fourth direction, routes of the different second bias voltage lines 115 are matched with outer outlines of the second radiation structures 22, and routes of the different third bias voltage lines 214 are matched with outer outlines of the first radiation structures 12. That is, the second bias voltage lines 115 and the third bias voltage lines 214 are polygonal lines.

In a third aspect, the embodiments of the present disclosure further provide an electronic device. The electronic device includes the antenna according to any of the above embodiments.

In some embodiments, the antenna in the electronic device further includes a transceiver unit, a radio frequency transceiver, a signal amplifier, a power amplifier, and a filter unit. The antenna in the communication device is a sending antenna or a receiving antenna. The transceiver unit includes a base band and a receiving terminal. The base band provides at least one frequency band signal, such as the 2G signal, the 3G signal, the 4G signal, the 5G signal, and the like, and sends at least one frequency band signal to the radio frequency transceiver. Upon receiving the signal, the antenna in the communication system transmits the signal to the receiving terminal of the transceiver unit upon processing by the filter unit, the power amplifier, the signal amplifier, and the radio frequency transceiver, and the receiving terminal is a smart gateway.

Furthermore, the radio frequency transceiver is connected to the transceiver unit for modulating the signal sent by the transceiver unit or demodulating the signal received by the antenna and transmitting the signal back to the transceiver unit. Specifically, the radio frequency transceiver includes a transmitting circuit, a receiving circuit, a modulation circuit, and a demodulation circuit. After the transmitting circuit receives various types of signals provided by the baseband, the modulation circuit modulates various types of signals provided by the baseband and then sends to the antenna. The antenna receives the signal and transmits to the receiving circuit of the radio frequency transceiver, the receiving circuit transmits the signal to the demodulation circuit, and the demodulation circuit demodulates the signal and then transmits to the receiving terminal.

Furthermore, the radio frequency transceiver is connected to the signal amplifier and the power amplifier, and the signal amplifier and the power amplifier are connected to the filter unit, and the filter unit is connected to at least one antenna. In sending signals by the communication system, the signal amplifier is used to improve the signal-to-noise ratio of the signals output by the radio frequency transceiver and then transmit to the filter unit. The power amplifier is used to amplify the power of the signal output by the radio frequency transceiver and then transmit to the filter unit. The filter unit specifically includes a duplexer and a filter circuit. The filter unit combines the signals output by the signal amplifier and the power amplifier, filters the noise wave and transmits to the antenna, and the antenna radiates the signal. In receiving signals by the communication system, the antenna transmits the signals to the filter unit upon receiving the signals, and the filter unit filters the noise wave from the signals received by the antenna and transmits to the signal amplifier and the power amplifier, and the signal amplifier gains the signals received by the antenna to increase the signal-to-noise ratio of the signals. The power amplifier amplifies the power of the signal received by the antenna. The signal received by the antenna is processed by the power amplifier and signal amplifier and transmits to the radio frequency transceiver, and the radio frequency transceiver then transmits to the transceiver unit.

In some embodiments, the signal amplifier includes various types of signal amplifiers, such as a low noise amplifier, which is not limited herein.

In some embodiments, the antenna in the embodiments of the present disclosure further includes a power management unit, and the power management unit is connected to the power amplifier to provide the voltage with amplified signal for the power amplifier.

It can be understood that the above embodiments are exemplary embodiments for illustrating the principles of the present disclosure, and should not be construed as limiting the present disclosure. A person of ordinary skill in the art can obtain variations and improvements without departing from the spirit or essence of the present disclosure, the variations and improvements are within the scope of the protection of the present disclosure.

The invention claimed is:

1. An antenna, comprising: a first antenna unit and a second antenna unit, wherein the first antenna unit comprises a first phase-tuning structure and a first radiation structure, and the second antenna unit comprises a second phase-tuning structure and a second radiation structure; wherein a first feed terminal of the first phase-tuning structure is electrically connected to the first radiation structure, and a first feed terminal of the second phase-tuning structure is electrically connected to the second radiation structure; and a feed direction of the first feed terminal of the first phase-tuning structure to the first radiation structure is a first direction, and a feed direction of the first feed terminal of the second phase-tuning structure to the second radiation structure is a second direction, the first direction being different from the second direction, wherein in the case that the first antenna unit rotates by a predetermined angle and overturns by 180°, the first feed terminal of the first phase-tuning structure is coincident with the first feed terminal of the second phase-tuning structure, and the first radiation structure is coincident with the second radiation structure.

2. The antenna according to claim 1, further comprising: a first dielectric substrate and a second dielectric substrate that are opposite to each other, wherein the first phase-tuning structure and the second phase-tuning structure are disposed between the first dielectric substrate and the second dielectric substrate; wherein an orthographic projection of the first radiation structure on the first dielectric substrate is a first pattern, and an orthographic projection of the second radiation structure on the first dielectric substrate is a second pattern; and an orthographic projection of the first phase-tuning structure on the first dielectric substrate is at least partially disposed between the first pattern and the second pattern, or an orthographic projection of the second phase-tuning structure on the first dielectric substrate is at least partially disposed between the first pattern and the second pattern.

3. The antenna according to claim 1, further comprising: a first dielectric substrate and a second dielectric substrate that are opposite to each other; wherein the first phase-tuning structure comprises a first electrode on a side, close to the second dielectric substrate, of the first dielectric substrate, a second electrode on a side, close to the first dielectric substrate, of the second dielectric substrate, and a first tunable dielectric layer between the first electrode and the second electrode; and the second phase-tuning structure comprises a third electrode on a side, close to the second dielectric substrate, of the first dielectric substrate, a fourth electrode on a side, close to the first dielectric substrate, of the second dielectric substrate, and a second tunable dielectric layer between the third electrode and the fourth electrode.

4. The antenna according to claim 3, further comprising: a third dielectric substrate, a first reference electrode layer, and a second reference electrode layer; wherein the third dielectric substrate is disposed on a side, facing away from the first dielectric substrate, of the second dielectric substrate;

the first reference electrode layer is disposed between the second dielectric substrate and the third dielectric substrate, and a first via and a second via are defined in the first reference electrode layer, wherein the first feed terminal of the first phase-tuning structure is electrically connected to the first radiation structure through the first via, and the first feed terminal of the second phase-tuning structure is electrically connected to the second radiation structure through the second via; and the second reference electrode layer is disposed on a side, facing away from the second dielectric substrate, of the first dielectric substrate.

5. The antenna according to claim 3, wherein each of the first radiation structure and the second radiation structure comprises a first radiation portion and a second radiation portion, and the antenna further comprises a third dielectric substrate, a first reference electrode layer, and a second reference electrode layer; wherein the third dielectric substrate is disposed on a side, facing away from the first dielectric substrate, of the second dielectric substrate;

the first reference electrode layer is disposed between the second dielectric substrate and the third dielectric substrate, and a first via and a second via are defined in the first reference electrode layer, wherein the first feed terminal of the first phase-tuning structure is electrically connected to the first radiation portion of the first radiation structure through the first via, and the first feed terminal of the second phase-tuning structure is electrically connected to the first radiation portion of the second radiation structure through the second via; and the second reference electrode layer is disposed on a side, facing away from the second dielectric substrate, of the first dielectric substrate, and a third via and a fourth via are defined in the second reference electrode layer, wherein a second feed terminal of the first phase-tuning structure is electrically connected to the second radiation portion of the first radiation structure through the third via, and a second feed terminal of the second phase-tuning structure is electrically connected to the second radiation portion of the second radiation structure through the fourth via.

6. The antenna according to claim 3, further comprising: a third dielectric substrate, a fourth dielectric substrate, a first reference electrode layer, a second reference electrode layer, a first feed source, and a second feed source; wherein the third dielectric substrate is disposed on a side, facing away from the first dielectric substrate, of the second dielectric substrate;

the first reference electrode layer is disposed between the second dielectric substrate and the third dielectric substrate, and a first via and a second via are defined in the first reference electrode layer, wherein the first feed terminal of the first phase-tuning structure is electrically connected to the first radiation structure through the first via, and the first feed terminal of the second phase-tuning structure is electrically connected to the second radiation structure through the second via;

the second reference electrode layer is disposed on a side, facing away from the second dielectric substrate, of the first dielectric substrate, and a third via and a fourth via are defined in the second reference electrode layer;

the fourth dielectric substrate is disposed on a side, facing away from the first dielectric substrate, of the second reference electrode layer; and the first feed source and the second feed source are disposed on a side, facing away from the second reference electrode layer, of the fourth dielectric substrate, the first feed source is electrically connected to a second feed terminal of the first phase-tuning structure through the third via, and the second feed source is electrically connected to a second feed terminal of the second phase-tuning structure through the fourth via.

7. The antenna according to claim 1, wherein the first direction is perpendicular to the second direction.

8. An antenna array, comprising: an antenna, wherein the antenna comprises: a first antenna unit and a second antenna unit, wherein the first antenna unit comprises a first phase-tuning structure and a first radiation structure, and the second antenna unit comprises a second phase-tuning structure and a second radiation structure; wherein a first feed terminal of the first phase-tuning structure is electrically connected to the first radiation structure, and a first feed terminal of the second phase-tuning structure is electrically connected to the second radiation structure; and a feed direction of the first feed terminal of the first phase-tuning structure to the first radiation structure is a first direction, and a feed direction of the first feed terminal of the second phase-tuning structure to the second radiation structure is a second direction, the first direction being different from the second direction, wherein in the case that the first antenna unit rotates by a predetermined angle and overturns by 180°, the first feed terminal of the first phase-tuning structure is coincident with the first feed terminal of the second phase-tuning structure, and the first radiation structure is coincident with the second radiation structure.

9. The antenna array according to claim 8, wherein a plurality of antennas are organized to a plurality of first antenna sets juxtaposed in a third direction and a plurality of second antenna sets juxtaposed in a fourth direction; wherein the antennas in the plurality of first antenna sets are juxtaposed in the fourth direction, and the antennas in the plurality of second antenna sets are juxtaposed in the third direction; and a distance between the first radiation structures in the antennas adjacent in the third direction is a first distance, and a distance between the second radiation structures in the antennas adjacent in the third direction is a second distance, the first distance being equal to the second distance; or a distance between the first radiation structures in the antennas adjacent in the fourth direction is a third distance, and a distance between the second radiation structures in the antennas adjacent in the fourth direction is a fourth distance, the third distance being equal to the fourth distance.

10. The antenna array according to claim 8, wherein a plurality of antenna units are organized to a plurality of first antenna sets juxtaposed in a third direction, wherein the antennas in the plurality of first antenna sets are juxtaposed in a fourth direction, and adjacent first antenna sets in the plurality of first antenna sets are offset;

wherein for two antennas in the adjacent first antenna sets with a same order, a distance between two first radiation structures in the two antennas is a fifth distance, and a distance between two second radiation structures in the two antennas is a sixth distance, the fifth distance being equal to the sixth distance.

11. The antenna array according to claim 8, wherein the antenna further comprises a first dielectric substrate and a second dielectric substrate that are opposite to each other, wherein the first phase-tuning structure comprises a first electrode on a side, close to the second dielectric substrate, of the first dielectric substrate, a second electrode on a side, close to the first dielectric substrate, of the second dielectric substrate, and a first tunable dielectric layer between the first electrode and the second electrode;

the second phase-tuning structure comprises a third electrode on a side, close to the second dielectric substrate, of the first dielectric substrate, a fourth electrode on a side, close to the first dielectric substrate, of the second dielectric substrate, a fourth bias voltage line electrically connected to the fourth electrode, and a second tunable dielectric layer between the third electrode and the fourth electrode; and a plurality of antenna units are organized to a plurality of first antenna sets juxtaposed in a third direction; wherein the antennas in the plurality of first antenna sets are juxtaposed in a fourth direction;

first electrodes in the first antenna units in the plurality of first antenna sets are connected to a same first bias voltage line, and third electrodes in the second antenna units in the plurality of first antenna sets are respectively connected to different third bias voltage lines; and second electrodes in the first antenna units in the plurality of first antenna sets are respectively connected to different second bias voltage lines, and fourth electrodes in the second antenna units in the plurality of first antenna sets are respectively connected to a same fourth bias voltage line.

12. The antenna array according to claim 8, wherein the antenna further comprises a first dielectric substrate and a second dielectric substrate that are opposite to each other; wherein the first phase-tuning structure comprises a first electrode on a side, close to the second dielectric substrate, of the first dielectric substrate, a second electrode on a side, close to the first dielectric substrate, of the second dielectric substrate, and a first tunable dielectric layer between the first electrode and the second electrode;

the second phase-tuning structure comprises a third electrode on a side, close to the second dielectric substrate, of the first dielectric substrate, a fourth electrode on a side, close to the first dielectric substrate, of the second dielectric substrate, a fourth bias voltage line electrically connected to the fourth electrode, and a second tunable dielectric layer between the third electrode and the fourth electrode; and a plurality of antenna units are organized to a plurality of second antenna sets juxtaposed in a fourth direction; wherein the antennas in the plurality of second antenna sets are juxtaposed in a third direction;

first electrodes in the first antenna units in the plurality of second antenna sets are connected to a same first bias voltage line, and third electrodes in the second antenna units in the plurality of second antenna sets are respectively connected to different third bias voltage lines; and second electrodes in the first antenna units in the plurality of second antenna sets are respectively connected to different second bias voltage lines, and fourth electrodes in the second antenna units in the plurality of second antenna sets are respectively connected to a same fourth bias voltage line.

13. The antenna array according to claim 12, wherein the different second bias voltage lines electrically connected to the second electrodes in the plurality of second antenna sets and the different third bias voltage lines electrically connected to the third electrodes in the plurality of second antenna sets are respectively disposed on two opposite sides of the plurality of second antenna sets in the fourth direction, routes of the different second bias voltage lines are matched with outer outlines of the second radiation structures, and routes of the different third bias voltage lines are matched with outer outlines of the first radiation structures.

14. The antenna array according to claim 8, further comprising: a first dielectric substrate and a second dielectric substrate that are opposite to each other, wherein the first phase-tuning structure and the second phase-tuning structure are disposed between the first dielectric substrate and the second dielectric substrate; wherein an orthographic projection of the first radiation structure on the first dielectric substrate is a first pattern, and an orthographic projection of the second radiation structure on the first dielectric substrate is a second pattern; and an orthographic projection of the first phase-tuning structure on the first dielectric substrate is at least partially disposed between the first pattern and the second pattern, or an orthographic projection of the second phase-tuning structure on the first dielectric substrate is at least partially disposed between the first pattern and the second pattern.

15. The antenna array according to claim 8, wherein the antenna array further comprises: a first dielectric substrate and a second dielectric substrate that are opposite to each other; wherein the first phase-tuning structure comprises a first electrode on a side, close to the second dielectric substrate, of the first dielectric substrate, a second electrode on a side, close to the first dielectric substrate, of the second dielectric substrate, and a first tunable dielectric layer between the first electrode and the second electrode; and the second phase-tuning structure comprises a third electrode on a side, close to the second dielectric substrate, of the first dielectric substrate, a fourth electrode on a side, close to the first dielectric substrate, of the second dielectric substrate, and a second tunable dielectric layer between the third electrode and the fourth electrode.

16. The antenna array according to claim 15, wherein the antenna array further comprises: a third dielectric substrate, a first reference electrode layer, and a second reference electrode layer; wherein the third dielectric substrate is disposed on a side, facing away from the first dielectric substrate, of the second dielectric substrate;

the first reference electrode layer is disposed between the second dielectric substrate and the third dielectric substrate, and a first via and a second via are defined in the first reference electrode layer, wherein the first feed terminal of the first phase-tuning structure is electrically connected to the first radiation structure through the first via, and the first feed terminal of the second phase-tuning structure is electrically connected to the second radiation structure through the second via; and the second reference electrode layer is disposed on a side, facing away from the second dielectric substrate, of the first dielectric substrate.

17. The antenna array according to claim 15, wherein each of the first radiation structure and the second radiation structure comprises a first radiation portion and a second radiation portion, and the antenna further comprises a third dielectric substrate, a first reference electrode layer, and a second reference electrode layer; wherein the third dielectric substrate is disposed on a side, facing away from the first dielectric substrate, of the second dielectric substrate;

the first reference electrode layer is disposed between the second dielectric substrate and the third dielectric substrate, and a first via and a second via are defined in the first reference electrode layer, wherein the first feed terminal of the first phase-tuning structure is electrically connected to the first radiation portion of the first radiation structure through the first via, and the first feed terminal of the second phase-tuning structure is electrically connected to the first radiation portion of the second radiation structure through the second via; and the second reference electrode layer is disposed on a side, facing away from the second dielectric substrate, of the first dielectric substrate, and a third via and a fourth via are defined in the second reference electrode layer, wherein a second feed terminal of the first phase-tuning structure is electrically connected to the second radiation portion of the first radiation structure through the third via, and a second feed terminal of the second phase-tuning structure is electrically connected to the second radiation portion of the second radiation structure through the fourth via.

18. An electronic device, comprising: an antenna array, wherein the antenna array comprises an antenna, wherein the antenna comprises: a first antenna unit and a second antenna unit, wherein the first antenna unit comprises a first phase-tuning structure and a first radiation structure, and the second antenna unit comprises a second phase-tuning structure and a second radiation structure; wherein a first feed terminal of the first phase-tuning structure is electrically connected to the first radiation structure, and a first feed terminal of the second phase-tuning structure is electrically connected to the second radiation structure; and a feed direction of the first feed terminal of the first phase-tuning structure to the first radiation structure is a first direction, and a feed direction of the first feed terminal of the second phase-tuning structure to the second radiation structure is a second direction, the first direction being different from the second direction, wherein in the case that the first antenna unit rotates by a predetermined angle and overturns by 180°, the first feed terminal of the first phase-tuning structure is coincident with the first feed terminal of the second phase-tuning structure, and the first radiation structure is coincident with the second radiation structure.

* * * * *